(12) United States Patent
Ghosh et al.

(10) Patent No.: US 11,334,389 B2
(45) Date of Patent: May 17, 2022

(54) ADAPTIVE SCHEDULING OF LATENCY-SENSITIVE EVENT-BASED PROCESSORS

(71) Applicant: Microsoft Technology Licensing, LLC, Redmond, WA (US)

(72) Inventors: Priyadarshi Ghosh, Karnataka (IN); Anand Patil, Madhya Pradesh (IN); Vishnu Kumar, Karnataka (IN); Aparajita, Karnataka (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 37 days.

(21) Appl. No.: 16/669,137

(22) Filed: Oct. 30, 2019

(65) Prior Publication Data
US 2021/0124621 A1    Apr. 29, 2021

Related U.S. Application Data
(60) Provisional application No. 62/924,777, filed on Oct. 23, 2019.

(51) Int. Cl.
*G06F 9/50* (2006.01)
(52) U.S. Cl.
CPC ...... *G06F 9/5044* (2013.01); *G06F 2209/506* (2013.01); *G06F 2209/5018* (2013.01)
(58) Field of Classification Search
None
See application file for complete search history.

(56) References Cited

U.S. PATENT DOCUMENTS

| | | | |
|---|---|---|---|
| 6,041,028 A * | 3/2000 | Quan | G11B 7/08541 369/44.28 |
| 7,269,713 B2 | 9/2007 | Anderson et al. | |
| 8,467,932 B2 | 6/2013 | Nielsen et al. | |
| 8,731,522 B2 | 5/2014 | Huynh | |
| 9,424,546 B2 | 8/2016 | Granshaw et al. | |
| 9,542,448 B2 | 1/2017 | Schoning | |
| 9,658,902 B2 | 5/2017 | Archer et al. | |
| 10,324,756 B2 | 6/2019 | Branson et al. | |

(Continued)

OTHER PUBLICATIONS

"Pseudo-Thread Prioritizatian in Mass Event Processing Systems", Retrieved from: https://blogs.sap.com/2017/03/27/pseudo-thread-prioritization-in-mass-event-processing-systems/, Mar. 27, 2017, 4 Pages.

(Continued)

*Primary Examiner* — Meng Ai T An
*Assistant Examiner* — Zujia Xu
(74) *Attorney, Agent, or Firm* — Christopher J. Volkmann; Kelly, Holt & Christenson, PLLC

(57) ABSTRACT

The latency corresponding to a latency-sensitive event-based processor is evaluated to determine whether the latency-sensitive event-based processor (EBP) should be prioritized. If so, constraints on the number of events that the latency-sensitive EBP can process are relaxed and the frequency with which the latency-sensitive EBP can process events is increased. At a next latency evaluation, if the latency-sensitive EBP no longer meets criteria for prioritization, the constraint on the number of events is returned to a nominal level, as is the frequency with which the latency-sensitive EBP can process events.

20 Claims, 8 Drawing Sheets

(56) References Cited

U.S. PATENT DOCUMENTS

| | | | | |
|---|---|---|---|---|
| 2005/0080639 | A1* | 4/2005 | Tang | G06Q 10/087 705/7.39 |
| 2006/0288346 | A1* | 12/2006 | Santos | G06F 9/5038 718/102 |
| 2012/0014659 | A1* | 1/2012 | Hugosson | H04N 7/188 386/228 |
| 2013/0151883 | A1* | 6/2013 | Winbom | H04L 12/6418 713/500 |
| 2014/0026144 | A1* | 1/2014 | Pack | G06F 9/505 718/105 |
| 2016/0054932 | A1* | 2/2016 | Wang | G06F 13/1668 711/151 |
| 2016/0062390 | A1* | 3/2016 | Hlond | G06F 1/08 713/500 |
| 2017/0060641 | A1* | 3/2017 | Ramaswamy | G06F 9/5038 |
| 2017/0132037 | A1* | 5/2017 | Sevigny | G06F 9/4881 |
| 2020/0004607 | A1* | 1/2020 | Mahajani | H04L 43/04 |
| 2020/0348968 | A1* | 11/2020 | Huchachar | G06F 16/256 |

OTHER PUBLICATIONS

Aniello, et al., "Adaptive Online Scheduling in Storm", In Proceedings of the 7th ACM International Conference on Distributed Event-Based Systems, Jun. 29, 2013, pp. 207-218.

Cugola et al., "Processing Flows of Information: From Data Stream to Complex Event Processing", In Proceedings of the ACM Computing Surveys (CSUR), vol. 44, Issue 3, Article 15, Jun. 2012, 62 Pages. i.

Nikos, Zacheilas, "Dynamic Load Balancing Techniques for Distributed Complex Event Processing Systems", In the Book of IFIP International Conference on Distributed Applications and Interoperable Systems, May 24, 2016, pp. 174-188.

"International Search Report and Written Opinion Issued in PCT Application No. PCT/US20/054883", dated Jan. 18, 2021, 16 Pages.

Zakirul, MD, "e-Sampling Event-Sensitive Autonomous Adaptive Sensing and Low-cost Monitoring in Networked Sensing Systems", Retrieved From: https://cis.temple.edu/~wu/research/publications/Publication_files/Alam16-ACMTAAS.pdf, Mar. 27, 2017, pp. 1:1-1:29.

* cited by examiner

ADAPTIVE SCHEDULING OF LATENCY-SENSITIVE EVENT-BASED PROCESSORS

BACKGROUND

Computer systems are currently in wide use. Some computer systems host services, such as electronic mail systems, calendar systems, document management systems, among a wide variety of other systems.

These types of computing systems often perform read/write operations to a database. For example, there may be read/write operations performed in a database to add an appointment to a user's calendar, to delete an appointment, etc. Similarly, there may be read/write operations corresponding to electronic mail messages that are sent and received and otherwise processed by an electronic mail system or read/write operations performed by a document management system, etc.

Also, it is not uncommon for such systems to use event-based processors. These types of processors work on events generated by an operation in a database, and execute certain logic based on the event. For example, a user may book a flight reservation using an online booking system and receive a flight booking email that confirms the user's reservation. The flight booking email may include the flight information that is highlighted by different visual elements, such as tabs. In some systems, the flight booking email appears this way because an event-based processor was triggered by an event that was generated when the flight booking email arrived at the user's mailbox. The event-based processor parsed the email content and created templates and other visual elements that the data was placed into.

The discussion above is merely provided for general background information and is not intended to be used as an aid in determining the scope of the claimed subject matter.

SUMMARY

The latency corresponding to a latency-sensitive event-based processor is evaluated to determine whether the latency-sensitive event-based processor (EBP) should be prioritized. If so, constraints on the number of events that the latency-sensitive EBP can process are relaxed and the frequency with which the latency-sensitive EBP can process events is increased. At a next latency evaluation, if the latency-sensitive EBP no longer meets criteria for prioritization, the constraint on the number of events is returned to a nominal level, as is the frequency with which the latency-sensitive EBP can process events.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
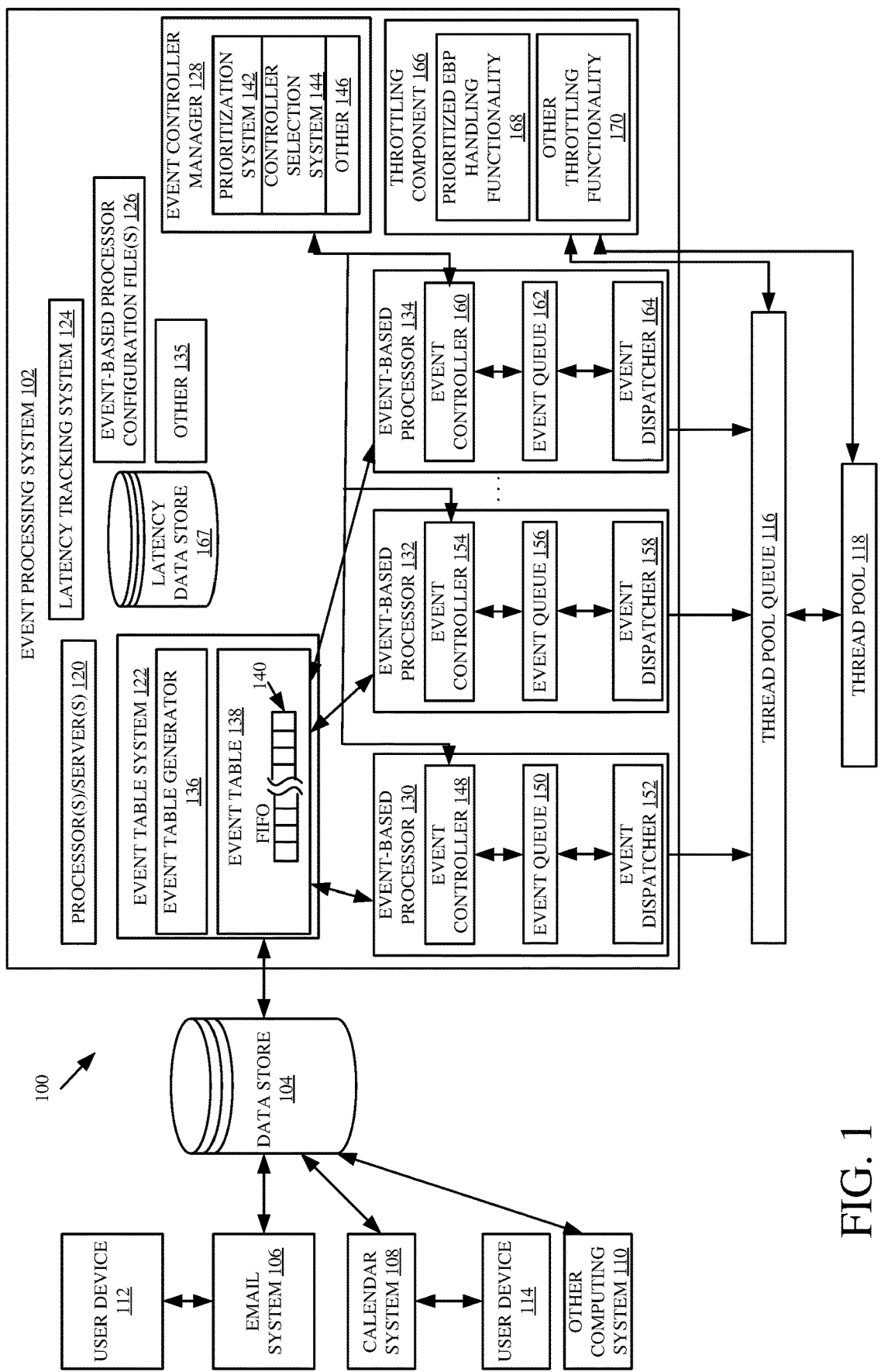
FIG. 1 is a block diagram of one example of an event-processing system architecture.

In many current event-based processing systems, all event-based processors are given equal priority in processing their corresponding events. However, there is throttling for processing events on a per event-processor basis, in that such systems often constrain the number of events that a particular event-based processor can process at a given time. This type of throttling is done in order to allocate computing thread resources somewhat equitably among the event-based processors that are competing for them.

However, this type of throttling can result in a processing lag for the event-based processors when the event load is high. By way of example, when an event-based processor is processing events generated by an electronic mail system, the load is often high in morning office hours when users are checking and replying to emails. The difference in time between when an event is generated and when it is processed by a corresponding event-based processor is sometimes referred to as the event processing latency. This latency can be minutes, or even hours, depending on the event load.

For some event-based processors, an extensive latency can lead to a loss of functionality. This is because the delayed event processing causes the event-based processor to miss the opportunity to process information, before that processed information is needed.

As an example, consider the scenario discussed above, in which a user booked a flight and received a flight booking email with the flight information. If the user opens the flight booking email before it is processed by the event-based processor that places the flight information in a particular format, then the functionality of the event-based processor is lost, because the information was accessed before the processing was able to take place.

These types of event-based processors (where functionality can be lost due to increased latency) are referred to as latency-sensitive event-based processors (or latency-sensitive EBPs). Some latency-sensitive EBPs define their own expected latency (e.g., the latency within which the event-based processor expects to process an event) in a configuration file, although this is only one example of how a latency-sensitive event-based processor can be identified.

The present discussion thus proceeds with respect to a system and technique in which the latency corresponding to a latency-sensitive EBP is monitored. When it exceeds a particular level (such as a pre-defined or dynamic threshold), then the latency-sensitive EBP is prioritized. While it is prioritized, it is illustratively allowed to process a higher number of events at one time, and it is allowed to process events more frequently, relative to other EBPs. The description also proceeds with respect to a dynamic system which intermittently monitors the latency corresponding to a latency-sensitive EBP so that when the latency returns to a normal level, the latency-sensitive EBP can be de-prioritized. This conserves system resources. By way of example, if all latency-sensitive EBPs were continuously prioritized (e.g., able to process more events than other EBPs and were able to process them more frequently), then the latency-sensitive EBPs would be consuming more computing resources than would be needed, even when their latency was relatively low. By dynamically adjusting the prioritization of the latency-sensitive EBPs, the present discussion addresses increasing latency, without compromising allocation of computing resources.

FIG. 1 is a block diagram showing one example of an event processing system architecture 100. In the example shown in FIG. 1, architecture 100 shows event processing system 102 that is coupled to data store 104. Data store 104 is illustratively accessed by various different computing systems, such as electronic mail (email) system 106, calendar system 108, and it can be accessed by other systems that source events that will need to be processed by event processing system 102. The other computing systems are indicated by block 110.

In the example shown in FIG. 1, email system 106 is shown being accessed by one or more user devices 112, and calendar system 108 is shown being accessed by one or more user devices 114. Users can interact with user devices 112 and 114 to engage email functionality on email system 106 and calendar functionality on calendar system 108. The data corresponding to a user's email and calendar may be stored in data store 104, or elsewhere.

FIG. 1 also shows that event processing system 102 may receive information indicative of events that take place in data store 104 (such as read/write events induced by the computing systems 106, 108, 110, etc.). Event processing system 102 places events in thread pool queue 116. Those events are processed by various threads in thread pool 118.

It will be noted that the present description proceeds with respect to processing read/write events that occur in data store 104. However, this is only one example. Other events generated by other systems can be processed by event processing system 102 as well, and read/write events in data store 104 are only described for the sake of example.

Before describing the overall operation of architecture 100 in more detail, a brief description of some of the items in architecture 100, and their operation, will first be provided.

Event processing system 102 illustratively includes one or more processors or servers 120, event table system 122, latency tracking system 124, event-based processor configuration files 126, event controller manager 128, and a plurality of event-based processors 130, 132 and 134.

Event table system 102 illustratively includes event table generator 136, and event table 138. Event table 138 illustratively includes a first-in first-out table of events 140 that are generated and placed in event table 138 based on actions that take place in data store 104. Event table generator 136 receives an indication when a read/write event occurs in data store 104 and places an entry in event table 138, as one of the events 140, indicative of the read/write event that took place in data store 104.

Event controller manager 128 illustratively includes prioritization system 142, controller selection system 144, and it can include other items 146. Event-based processing system 102 also illustratively includes throttling component 166. Throttling component 166 can include prioritized EBP handling functionality 168, and any of a wide variety of other throttling functionality 170.

Event processor 130 illustratively includes event controller 148, event queue 150, and event dispatcher 152. Event-based processor 132 includes event controller 154, event queue 156, and event dispatcher 158. Event-based processor 134 illustratively includes event controller 160, event queue 162, and event dispatcher 164. The event-based processors can include other items as well.

The event-based processors 130, 132, and 134 can be similar or different. In the example illustrated in FIG. 1, they are similar so that only event-based processor 130 is described in more detail.

As discussed above, whenever a database update happens in data store 104, and event table generator 136 places an event it in event table 138. Event controller manager 128 enables the different event controllers 148, 154 and 160 to execute in a sequential manner In doing so, each event controller 148, 154 and 160 has a chance to pull new events from event table 138, only after all of the other controllers have done this at least once.

When controlled to do so by event controller manager 128, event controller 148 pulls events from event table 138 and applies controller-specific filters to determine whether the event is to be processed by event-based processor 130. If so, it places the event in event queue 150 for processing. In one example, event queue 150 has an upper limit. For instance, it may be that event controller 148 only pulls events from event table 138 and places them in event queue 150 so long as event queue 150 contains no more than 500 events. The event queue 150 may have a different size as well, and 500 is discussed for the sake of example only.

Event dispatcher 152 schedules the processing of events in event queue 150. In one example, there may be one event dispatcher per event-based processor 130 per mailbox represented in data store 104 (or per other unit of memory). Event dispatcher 152 creates a task to be processed when there are events to be processed in event queue 150, and it places that task in thread pool queue 116. The next free thread from thread pool 118 processes the task at the head of the thread pool queue 116. Also, in one example, thread pool queue 116 may be a first-in, first-out queue.

In one example, throttling component 166 may place some limitations on the processing. For instance, it may be that a thread from thread pool 118 pulls a task placed in the thread pool queue 116 by event dispatcher 152 only if tasks from event-based processor 130 are consuming fewer than a threshold number of threads (such as 15 threads or another number of threads). Similarly, thread pool 118 may pull an event from thread pool queue 116 so long as no other thread 118 is processing events for the same event-based processor 130 (and, for example, for the same mailbox). These limitations or constraints are provided as examples only, and additional or different constraints may be used as well.

When an event in thread pool queue 116 is not processed, because it violates one of the constraints, then it is illustratively placed back at the end of thread pool queue 116 so that it can be processed at a later time.

Throttling component 166 may enforce additional constraints on event-based processor 130. For instance, in one example, throttling component 166 may constrain threads from thread pool 118 so that the thread processes only a predetermined number of events that are placed in thread pool queue 116 by a particular event dispatcher 152 at any given time, before the thread is released to process events for another event-based processor. By way of example, it may be that throttling component 166 limits the threads in thread pool 118 to processing only 10 events from thread pool queue 116 that are placed by a particular event dispatcher 152 in thread pool queue 118, at any given time. If there are more events to be processed, that have been placed in queue 116 by dispatcher 152, then dispatcher 152 enqueues another task into the thread pool queue 116, so that those events can be processed at a later time.

Latency tracking system 124 is illustratively triggered intermittently to track the latency of certain event-based processors 130, 132 and 134, where they are identified as latency-sensitive EBPs. In one example, each EBP 130, 132 and 134 has a corresponding configuration file 126. These configuration files may have a value indicating whether the corresponding event-based processor is latency-sensitive, and indicating the latency with which that processor expects to process events. Again, the latency may be measured as the time between when the event was created and placed in event table 138 by event table system 122, and when it is processed by a thread from thread pool 118. This information can be tracked by system 124 and stored as latency data in latency data store 167. As an example, latency tracking system 124 compares a timestamp indicating when the event was placed in event table 138 with a timestamp indicating when the event was processed, and places that comparison results in latency data store 167, corresponding to the particular event-based processor that processed the event. therefore, in one example, once the evaluation criteria are met, indicating that it is time to do a latency evaluation, latency tracking system 124 identifies which of the event-based processors 130, 132, and 134 are latency-sensitive EBPs and accesses latency data 167 for those EBP.

Latency tracking system 124 can generate a metric indicative of the latency corresponding to all latency-sensitive EBPs to determine whether they are exceeding their expected latency levels. In one example, so long as a particular percent of the events processed by a latency-sensitive EBP are within the expected latency level, then no further action is taken, and event processing continues as normal. However, if the latency-sensitive EBP is exceeding its expected latency level, more often than desired (e.g., more than a threshold percent of time, etc.) then latency tracking system 124 indicates this to event controller manager 128. Prioritization system 142 then prioritizes that particular latency-sensitive EBP.

Assume, for the sake of example, that EBP 130 is a latency-sensitive EBP, and it is exceeding its corresponding expected latency value too often. In that case, prioritization system 142 will identify EBP 130 as a prioritized, latency-sensitive EBP, and control it as such. Controller selection system 144 selects which particular EBP 130, 132 and 134 can have its controller 148, 154 and 160 pull events from event table 138. When an EBP is prioritized, then controller selection system 144 selects that EBP more frequently than it would otherwise. This also means that the tasks for the EBP are added to the threadpool queue 116 more frequently ensuring that they are picked up by threads 118 quicker. As an example, assume there are ten EBP's (EBP1-EBP10) and EBP2 is prioritized, then it is moved to the start of the list of controllers, so the order of execution is: EBP2, EBP1, EBP3, EBP4 . . . EBP10 so that it can pull events from event table 138 sooner. It also increases the frequency with which EBP2 is selected to pull events so the order of execution of EBP1-EBP10 may be EBP2, EBP1, EBP3, EBP4, EBP5, EBP2, EBP6-EBP10, EBP2 . . . .

In this way, if EBP 130 is prioritized, its event controller 148 can more frequently access event table 138 and pull events from it and place them in its event queue 150, than the other event-based processors 132 and 134. In this way, event controller 148 is allowed to preferentially pull events from event table 138 at a higher frequency than the event controllers 154 and 160.

Latency tracking system 124 can also indicate that EBP 130 is prioritized to throttling component 166. In that case, prioritized EBP handling functionality 168 throttles the prioritized EBP in a different way. Instead of allowing threads in thread pool 118 to process events placed in thread pool queue 116 by event dispatcher 158, only 10 at a time, before the thread is released back to thread pool 118, functionality 168 may reduce that constraint so that the threads can process 20 events from dispatcher 152 at a time (before being released). In one example, the constraint can be reduced in a pre-defined way (such as increasing the number of events that can be processed before the thread is released to a pre-determined number), or it can be changed dynamically. A dynamic change may be made, for instance, based upon the latency amount by which event-based processor 130 is exceeding its expected latency. If it is exceeding its expected latency by a larger amount, then both prioritization system 142 in event controller manager 128 and prioritized EBP handling functionality 168 in throttling component 166 can change the level of prioritization so that EBP 130 can process even more events. These are examples only.

Figure 2A:
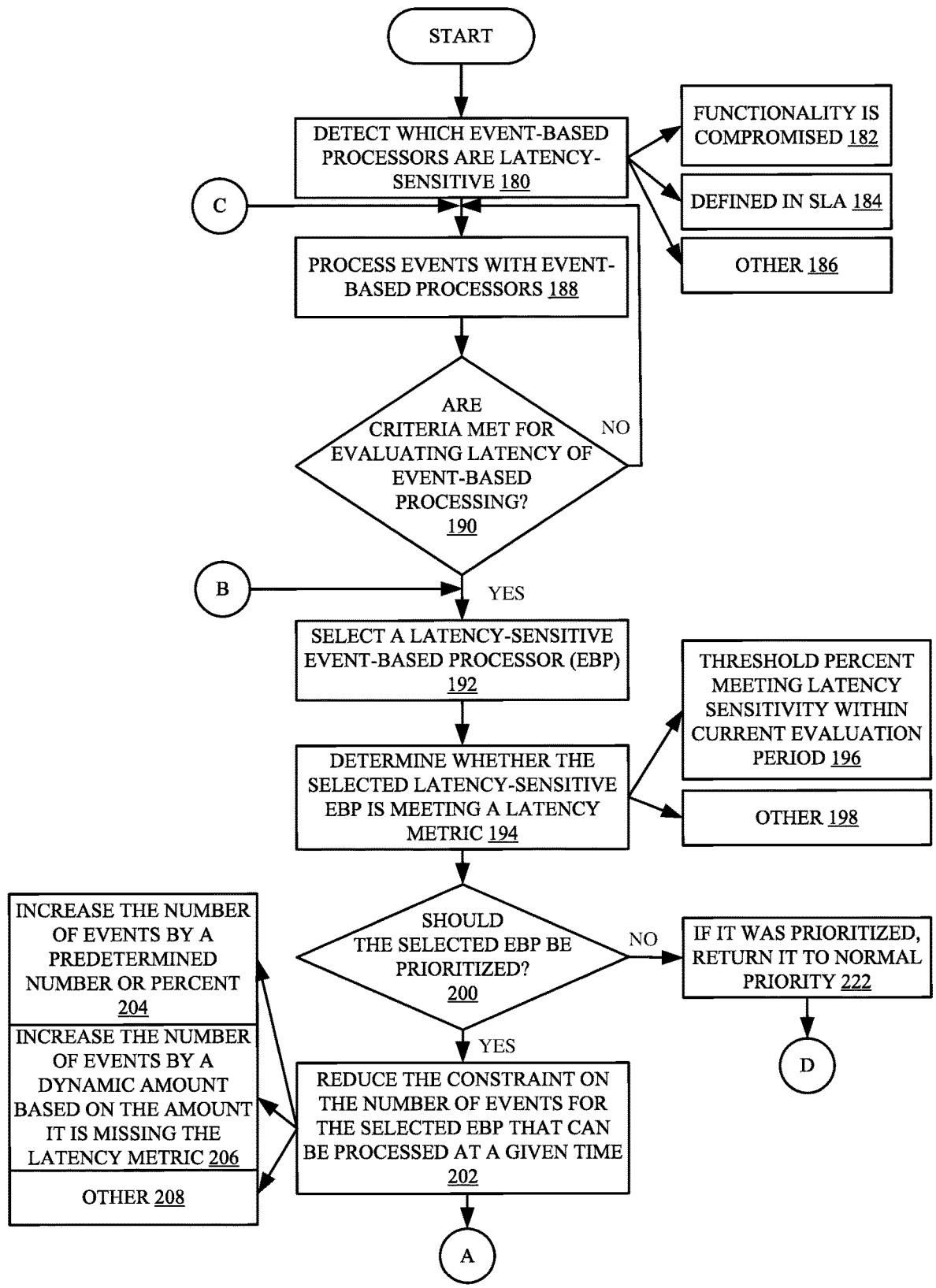
FIGS. 2A and 2B (collectively referred to herein as FIG. 2) show a flow diagram illustrating one example of the operation of the event processing system architecture shown in FIG. 1.
Figure 2B:
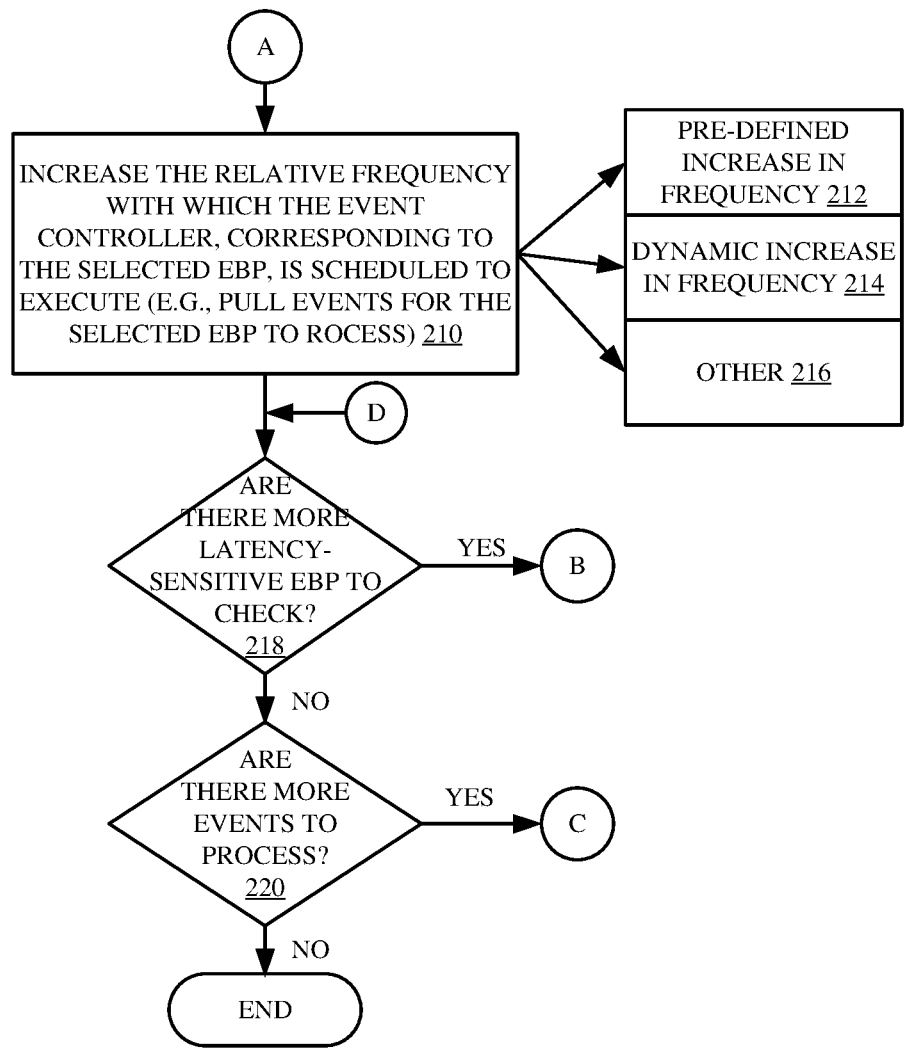

FIGS. 2A and 2B (collectively referred to herein as FIG. 2) show a flow diagram illustrating one example of the operation of architecture 100, shown in FIG. 1, in processing events, and in prioritizing latency-sensitive EBPs, when they are falling behind. Latency tracking system 124 first determines which event-based processors are latency sensitive. This is indicated by block 180 in the flow diagram of FIG. 2. Latency-sensitive event-based processors may be those which have functionality that will be compromised when the latency reaches a certain point. This is indicated by block 182. They may be those that have a defined latency (such as defined in a service level agreement, or otherwise). This is indicated by block 184. The event-based processor configuration files 126 can include this information, or the latency-sensitive EBPs can be defined in other ways as well, and this is indicated by block 186.

Event processing system 102 then begins processing events. This is indicated by block 188. This is done as discussed above, with event table generator 136 generating and placing events in event table 138 so they can be accessed by the different event-based processors 130, 132 and 134, under the control of event controller manager 128.

At some point, latency tracking system 124 will determine that criteria are met for evaluating the latency of latency-sensitive event-based processors. This is indicated by block 190 in the flow diagram of FIG. 2. In one example, latency tracking system 124 can evaluate the latency of the latency-sensitive EBPs every 10 minutes. In another example, it can evaluate them intermittently, under different load conditions, periodically, or in other ways.

When the criteria are met for evaluating latency, latency tracking system 124 accesses latency data 167 to determine whether the latency-sensitive EBPs are meeting their latency expectations, or whether they are exceeding them. It thus selects a latency-sensitive event-based processor and determines whether it is meeting a latency metric. Selecting a latency-sensitive EBP is indicated by block 192, and determining whether it is meeting a latency metric is indicated by block 194.

By way of example, latency tracking system 124 may determine whether a threshold percent of events are being processed within the desired latency sensitivity, within the current evaluation period. This is indicated by block 196. Determining whether the selected latency-sensitive EBP is meeting a latency metric can be done in a wide variety of other ways as well, and this is indicated by block 198.

System 124 then determines whether the latency-sensitive EBP should be prioritized. Assume, for the sake of example, that system 124 has selected EBP 130 and has determined, from latency data 167, that EBP 130 is not meeting its latency expectations. If this determination is made, then system 124 will determine that EBP 130 should be prioritized. This is indicated by block 200. If so, system 124, communicates this to throttling component 166 and to prioritization system 142 in event controller manager 128. Prioritization EBP handling functionality 168 then reduces the constraint on the number of events that the threads in thread pool 118 can process at a given time, for EBP 130. This is indicated by block 202. In one example, it increases the number of events that can be processed at a time by a pre-determined number or percent. This is indicated by block 204. In another example, it increases the number by a dynamic amount based on the magnitude by which the selected EBP 130 is missing its corresponding time latency metric. This is indicated by block 206. The constraint on the number of events that can be processed at any given time can be reduced in other ways as well, and this is indicated by block 208.

At the same time, prioritization system 142 increases the relative frequency with which controller selection system 144 selects event controller 148 to execute (e.g., to pull events from event table 138 for EBP 130 to process). This is indicated by block 210 in the flow diagram of FIG. 2. The relative frequency with which event controller 148 is scheduled to pull events from event table 138 can be increased by a pre-defined amount as indicated by block 212, or it can be dynamically increased as indicated by block 214. It can be increased in other ways as well, and this is indicated by block 216. In one example, the frequency is increased relative to the frequency with which event controller 154 and event controller 160 are scheduled to access event table 138.

Latency tracking system 124 can repeat this operation for each latency-sensitive EBP that it identifies. It will be noted that it can perform this processing substantially simultaneously with respect to all latency-sensitive EBPs, or it can perform the latency analysis sequentially, or in other ways. If there are more latency-sensitive EBPs for which latency is to be evaluated, as indicated by block 218, then processing reverts to block 192 where another latency-sensitive EBP is selected for evaluation.

So long as there are more events to process in event table 138, as indicated by block 220, processing reverts to block 188 where those events are processed. At the next evaluation period, the latency corresponding to the latency-sensitive EBPs are again evaluated.

Assume that, during this subsequent evaluation period, latency tracking system 124 determines that the selected latency-sensitive EBP is no longer behind (e.g., it is meeting its latency expectations). In that case, at block 200, if EBP 130 was prioritized before, then prioritization system 142 and prioritized EBP handling functionality 168 return EBP 130 to its normal priority. That is, event controller manager 128 allows event controller 148 to access event table 138 at a normal frequency (e.g., the same frequency as event controllers 154 and 160 or to the same frequency as before it was prioritized), and the number of events for EBP 130 that threads in thread pool 118 can process at a given time is also constrained to be the same as the other EBPs (or the same value as before EBP 130 was prioritized). Returning the EBP 130 to its non-prioritized state (or normal priority) is indicated by block 222 in the flow diagram of FIG. 2, and processing continues at block 218.

It can thus be seen that the present system intermittently analyzes the latency corresponding to latency-sensitive EBPs and prioritizes them so that they consume more event processing resources only when they are behind. As soon as they catch up, the EBPs are de-prioritized so that they don't consume more event processing resources than are needed to maintain their expected latency.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one example, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 3:
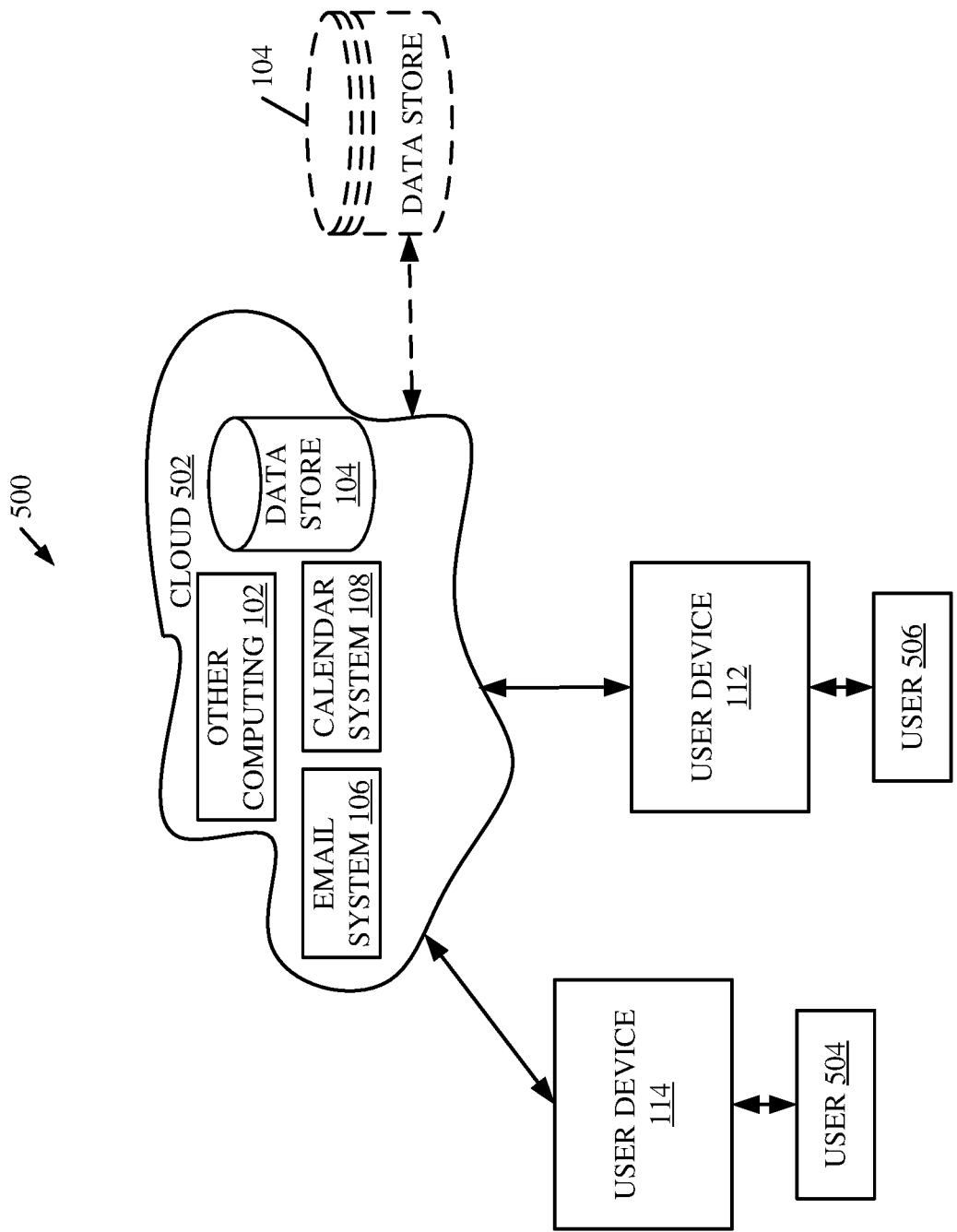
FIG. 3 is a block diagram illustrating one example of the architecture shown in FIG. 1, deployed in a cloud computing architecture.

FIG. 3 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various examples, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 3, some items are similar to those shown in FIG. 1 and they are similarly numbered. FIG. 3 specifically shows that calendar computing system 108 can be located in cloud 502 (which can be public, private, or a combination where portions are public while others are private). Therefore, users 504 and 506 use a user devices 112 and 114 to access those systems through cloud 502.

FIG. 3 also depicts another example of a cloud architecture. FIG. 3 shows that it is also contemplated that some elements of architecture 100 can be disposed in cloud 502 while others are not. By way of example, data store 104 can be disposed outside of cloud 502, and accessed through cloud 502. Regardless of where they are located, they can be accessed directly by devices 112 and 114, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 4:
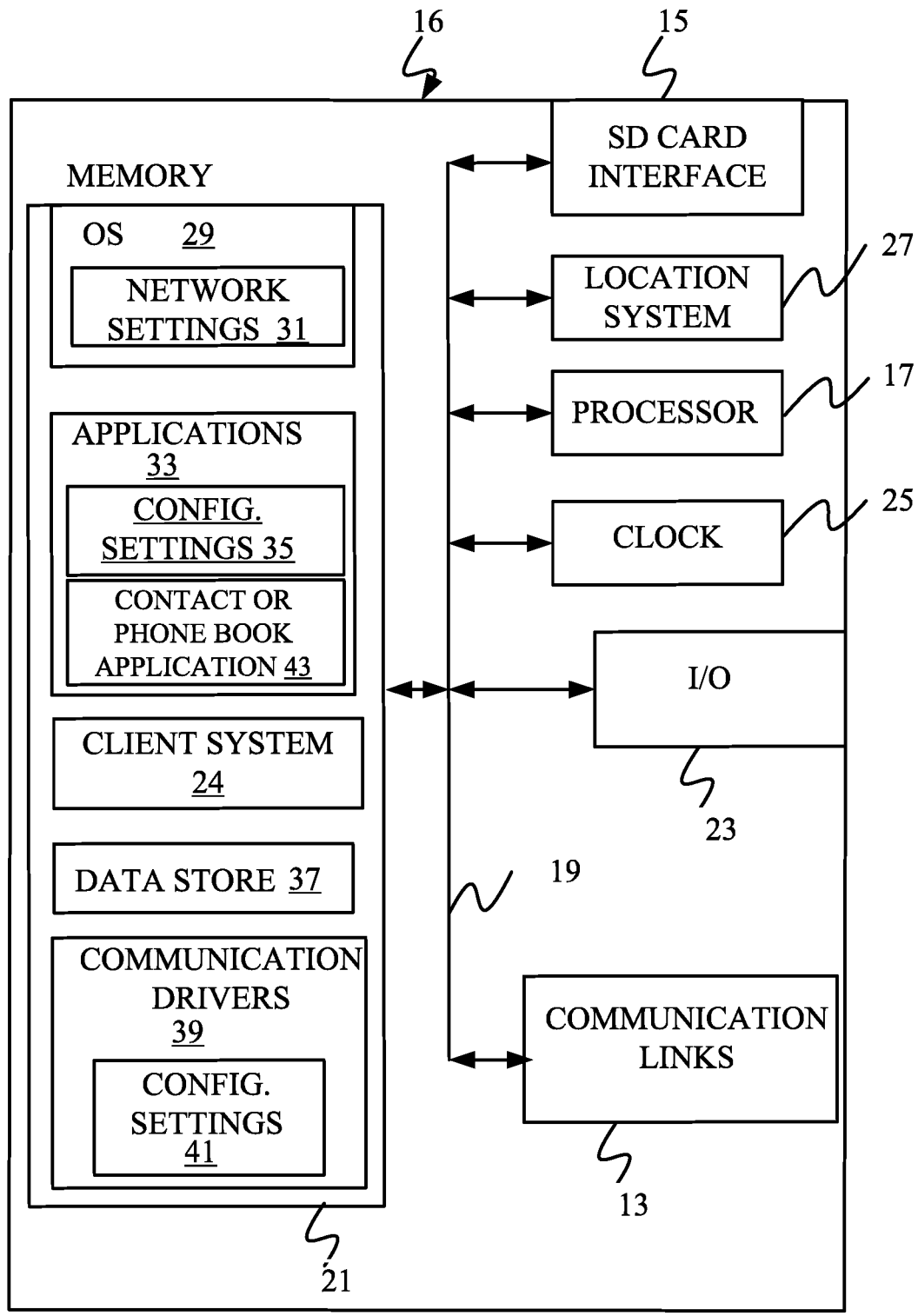
FIGS. 4-6 show examples of mobile devices that can be used in the architectures shown in the previous figures.
Figure 5:
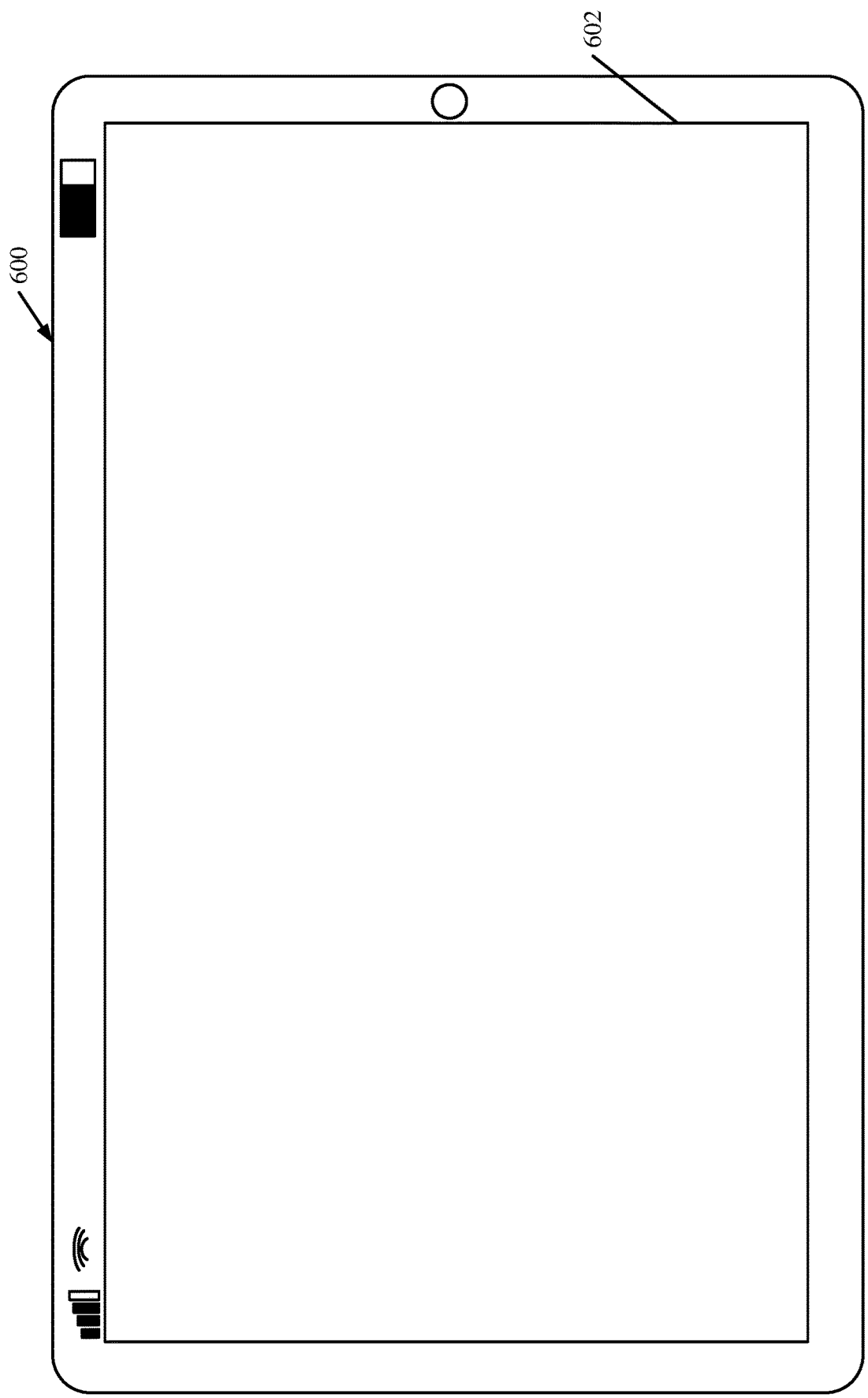
Figure 6:
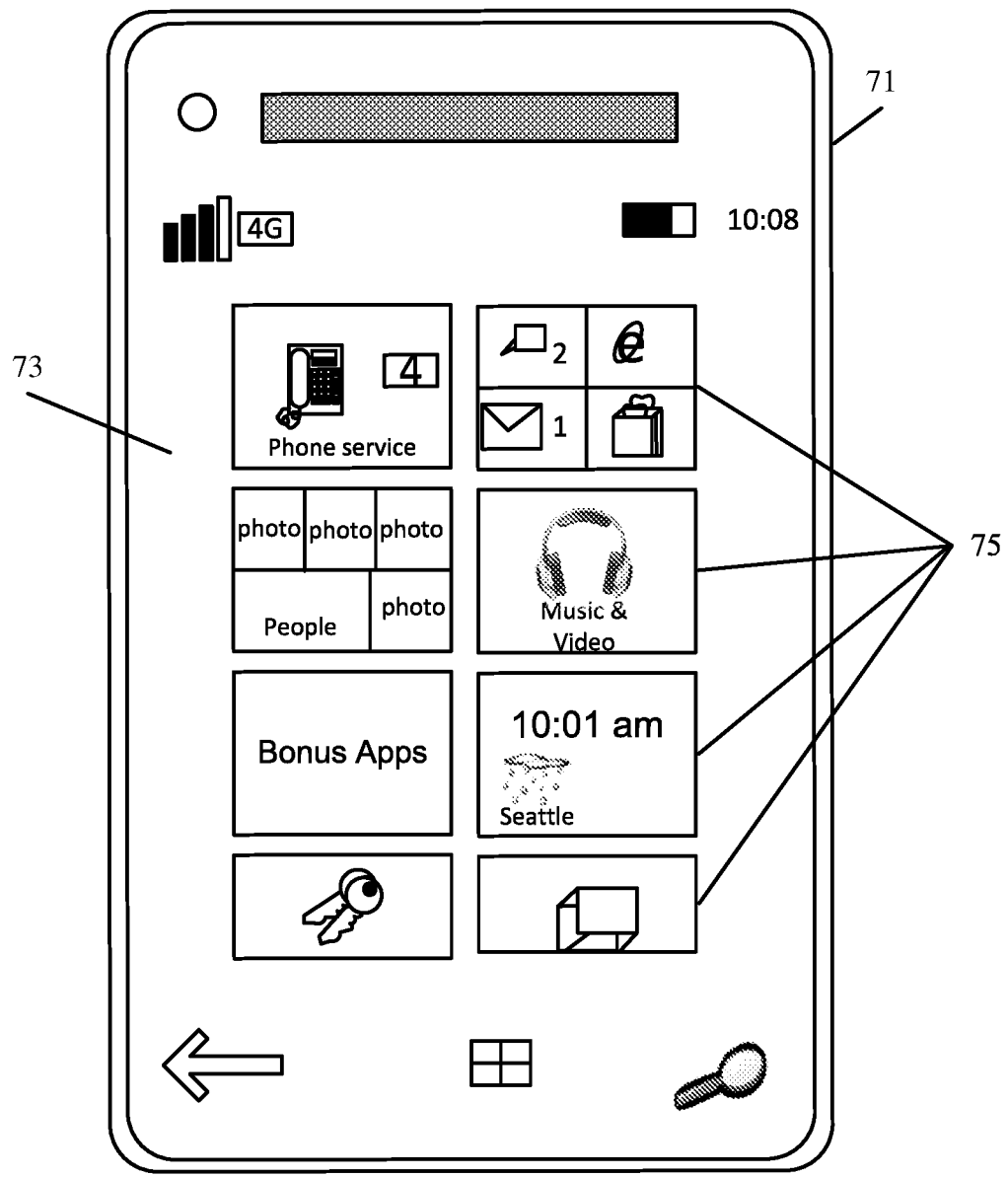

FIG. 4 is a simplified block diagram of one illustrative example of a handheld or mobile computing device that can be used as a user's or client's hand held device 16, in which the present system (or parts of it) can be deployed. FIGS. 5-6 are examples of handheld or mobile devices.

FIG. 4 provides a general block diagram of the components of a client device 16 that can run components user devices 112 and 114 or other systems or that interacts with architecture 100, or both. In the device 16, a communications link 13 is provided that allows the handheld device to communicate with other computing devices and under some embodiments provides a channel for receiving information automatically, such as by scanning Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1Xrtt, and Short Message Service, which are wireless services used to provide cellular access to a network, as well as Wi-Fi protocols, and Bluetooth protocol, which provide local wireless connections to networks.

In other examples, applications or systems are received on a removable Secure Digital (SD) card that is connected to a SD card interface 15. SD card interface 15 and communication links 13 communicate with a processor 17 (which can also embody processors or servers from other FIGS.) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client system 24 which can run various applications or embody parts or all of architecture 100. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 5 shows one example in which device 16 is a tablet computer 600. In FIG. 5, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 6 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 7:
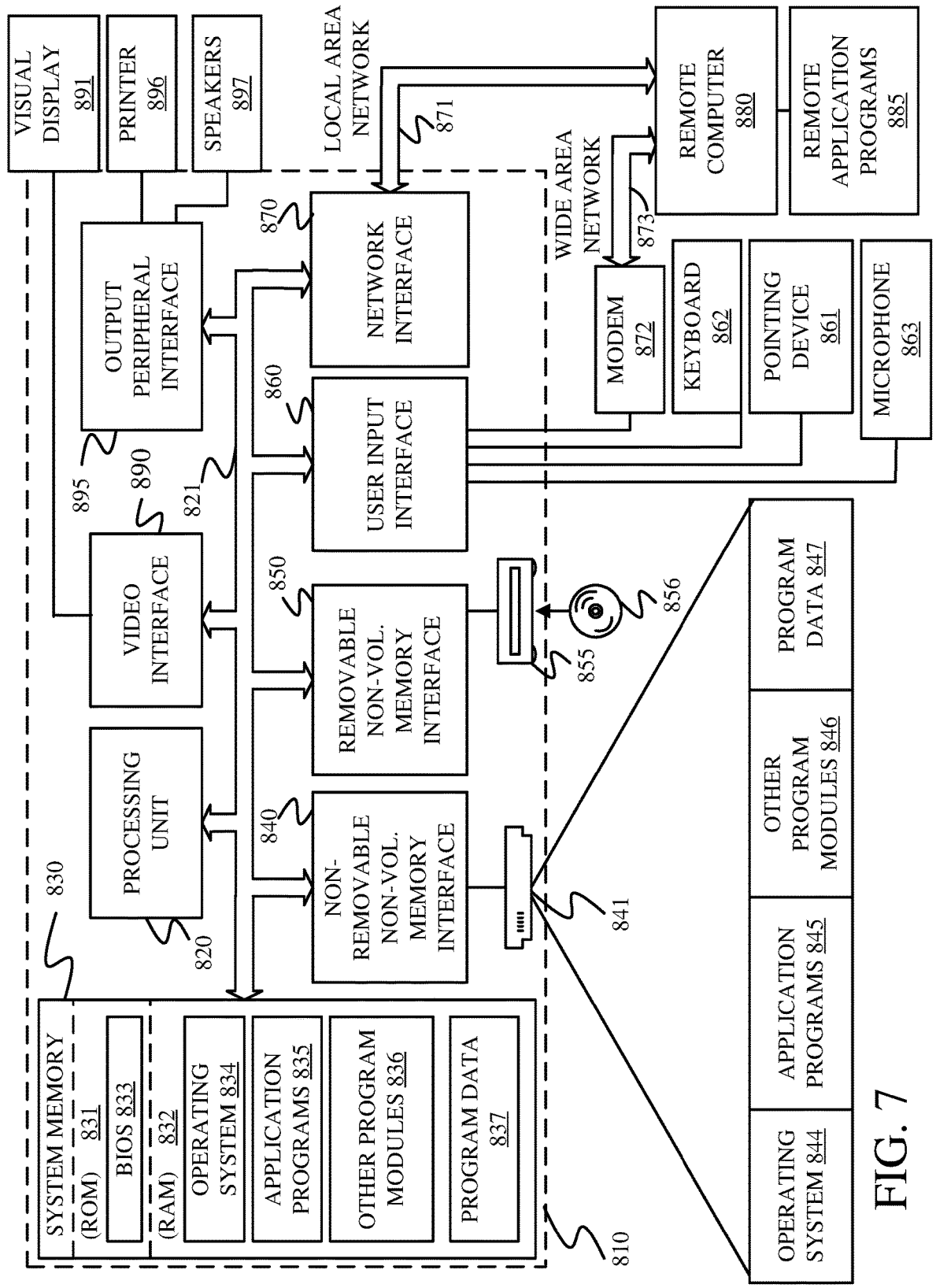
FIG. 7 is a block diagram showing one example of a computing environment that can be used in the architectures shown in the previous figures.

FIG. 7 is one example of a computing environment in which architecture 100, or parts of it, (for example) can be deployed. With reference to FIG. 7, an example system for implementing some embodiments includes a computing device in the form of a computer 810 programmed or configured as described above. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 10.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 7 illustrates operating system 834, application programs 835, other program modules 836, and program data 837.

The computer 810 may also include other removable/non-removable volatile/nonvolatile computer storage media. By way of example only, FIG. 7 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 7, provide storage of computer readable instructions, data structures, program modules and other data for the computer 810. In FIG. 7, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 7 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 7 illustrates remote application programs 885 as residing on remote computer 880. It will be appreciated that the network connections shown are exemplary and other means of establishing a communications link between the computers may be used.

It should also be noted that the different examples described herein can be combined in different ways. That is, parts of one or more examples can be combined with parts of one or more other examples. All of this is contemplated herein.

Example 1 is a computer implemented method, comprising:

determining when an event-based processor, in a set of event-base processors that are each selected at a first selection frequency to process events, is processing events with a latency that meets a latency value;

when the event-based processor is processing events with a latency that meets the latency value, then selecting the event-based processor to process events at a second selection frequency that is higher than the first selection frequency; and when the event-based processor is processing events with a latency that does not meet the latency value, then selecting the event-based processor to process events at the first selection frequency.

Example 2 is the computer implemented method of any or all previous examples and further comprising:

when the event-based processor is processing events with a latency that does not meet the latency value, then controlling threads in a thread pool by constraining threads in the thread pool to only process up to a first number of events, provided by the event-based processor, before processing events provided by another event-based processor.

Example 3 is the computer implemented method of any or all previous examples and further comprising:

when the event-based processor is processing events with a latency that meets the latency value, then controlling the threads in the thread pool by relieving constraint on the threads in the thread pool so the threads in the thread pool can process more than the first number of events provided by the event-based processor, before processing events provided by other event-based processors.

Example 4 is the computer implemented method of any or all previous examples wherein selecting the event-based processor to process events at the second frequency comprises:

selecting the event-based processor to process events at a pre-defined, increased frequency, relative to the first selection frequency.

Example 5 is the computer implemented method of any or all previous examples wherein selecting the event-based processor to process events at the second frequency comprises:

determining whether the event-based processor is processing events with a latency that exceeds the latency value; and if so, selecting the event-based processor to process events at a dynamically selected second frequency, selected based on an amount by which the event-based processor exceeds the latency value.

Example 6 is the computer implemented method of any or all previous examples wherein controlling threads by relieving the constraint comprises:

controlling the threads in the thread pool so they can process a predetermined number of events, that is more than the first number of events, provided by the event-based processor, before processing events provided by other event-based processors.

Example 7 is the computer implemented method of any or all previous examples wherein controlling threads by relieving the constraint comprises:

determining whether the event-based processor is processing events with a latency that exceeds the latency value; and if so, controlling the threads in the thread pool so they can process a dynamically selected number of events, that is more than the first number of events, provided by the event-based processor, before processing events provided by other event-based processors, the dynamically selected number of events being selected based on an amount by which the event-based processor exceeds the latency value.

Example 8 is the computer implemented method of any or all previous examples and further comprising:

identifying which event-based processors in the set of event-based processors are latency sensitive event-based processors that have functionality that is compromised by a latency that meets the latency value.

Example 9 is the computer implemented method of any or all previous examples and further comprising:

performing the step of determining when an event-based processor is processing events with a latency that meets a latency value, only for the event-based processors in the set of event-based processors that are identified as latency sensitive event-based processors.

Example 10 is a computer system, comprising:

one or more processors; and memory that stores instructions which, when executed by the one or more processors, cause the one or more processors to perform steps comprising:

determining when an event-based processor, in a set of event-base processors that are each selected at a first selection frequency to process events, is processing events with a latency that meets a latency value;

when the event-based processor is processing events with a latency that meets the latency value, then selecting the event-based processor to process events at a second selection frequency that is higher than the first selection frequency; and when the event-based processor is processing events with a latency that does not meet the latency value, then selecting the event-based processor to process events at the first selection frequency.

Example 11 is the computer system of any or all previous examples wherein, when the instructions are executed by the one or more processors, they cause the one or more processors to perform steps further comprising:

when the event-based processor is processing events with a latency that does not meet the latency value, then controlling threads in a thread pool by constraining threads in the thread pool to only process up to a first number of events, provided by the event-based processor, before processing events provided by another event-based processor.

Example 12 is the computer system of any or all previous examples wherein, when the instructions are executed by the one or more processors, they cause the one or more processors to perform steps further comprising:

when the event-based processor is processing events with a latency that meets the latency value, then controlling the threads in the thread pool by relieving constraint on the threads in the thread pool so the threads in the thread pool can process more than the first number of events provided by the event-based processor, before processing events provided by other event-based processors.

Example 13 is the computer system of any or all previous examples wherein selecting the event-based processor to process events at the second frequency comprises:

selecting the event-based processor to process events at a pre-defined, increased frequency, relative to the first selection frequency.

Example 14 is the computer system of any or all previous examples wherein selecting the event-based processor to process events at the second frequency comprises:

determining whether the event-based processor is processing events with a latency that exceeds the latency value; and if so, selecting the event-based processor to process events at a dynamically selected second frequency, selected based on an amount by which the event-based processor exceeds the latency value.

Example 15 is the computer system of any or all previous examples wherein controlling threads by relieving the constraint comprises:

controlling the threads in the thread pool so they can process a predetermined number of events, that is more than the first number of events, provided by the event-based processor, before processing events provided by other event-based processors.

Example 16 is the computer system of any or all previous examples wherein controlling threads by relieving the constraint comprises:

determining whether the event-based processor is processing events with a latency that exceeds the latency value; and if so, controlling the threads in the thread pool so they can process a dynamically selected number of events, that is more than the first number of events, provided by the event-based processor, before processing events provided by other event-based processors, the dynamically selected number of events being selected based on an amount by which the event-based processor exceeds the latency value.

Example 17 is the computer system of any or all previous examples wherein, when the instructions are executed by the one or more processors, they cause the one or more processors to perform steps further comprising:

identifying which event-based processors in the set of event-based processors are latency sensitive event-based processors that have functionality that is compromised by a latency that meets the latency value.

Example 18 is the computer system of any or all previous examples wherein, when the instructions are executed by the one or more processors, they cause the one or more processors to perform steps further comprising:

performing the step of determining when an event-based processor is processing events with a latency that meets a latency value, only for the event-based processors in the set of event-based processors that are identified as latency sensitive event-based processors.

Example 19 is a computer implemented method, comprising:

determining when an event-based processor, in a set of event-base processors that are each selected at a first selection frequency to process events, is processing events with a latency that meets a latency value;

when the event-based processor is processing events with a latency that does not meet the latency value, then controlling threads in a thread pool by constraining threads in the thread pool to only process up to a first number of events, provided by the event-based processor, before processing events provided by another event-based processor; and when the event-based processor is processing events with a latency that meets the latency value, then controlling the threads in the thread pool by relieving constraint on the threads in the thread pool so the threads in the thread pool can process more than the first number of events provided by the event-based processor, before processing events provided by other event-based processors.

Example 20 is the computer implemented method of any or all previous examples and further comprising:

when the event-based processor is processing events with a latency that meets the latency value, then selecting the event-based processor to process events at a second selection frequency that is higher than the first selection frequency; and when the event-based processor is processing events with a latency that does not meet the latency value, then selecting the event-based processor to process events at the first selection frequency.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer implemented method, comprising:
    determining an event-based processor, in a set of event-based processors, is a latency-sensitive event-based processor having functionality that is compromised by a latency that meets a latency value;
    detecting a set of events generated by operations in a computing environment;
    storing each event of the set of events in an event table;
    selecting the latency-sensitive event-based processor at a first selection frequency,
        wherein the first selection frequency defines a frequency at which the latency-sensitive event-based processor selects events from the event table;
    placing the selected events in an event queue corresponding to the latency-sensitive event-based processor and adding tasks, that correspond to the selected events from the event queue, to a thread pool queue configured to be processed by a plurality of threads in a thread pool;

controlling the plurality of threads in the thread pool to only process up to a first number of tasks, added to the thread pool queue by the latency-sensitive event-based processor, before processing tasks added by another event-based processor;

determining that the latency-sensitive event-based processor is processing events in the event table with a latency that meets a latency metric,
  wherein the latency represents a time between when a given event is detected and a task corresponding the given event is processed by a thread in the plurality of threads;

based on the determination, selecting the latency-sensitive event-based processor to process events in the event table at a second selection frequency that is higher than the first selection frequency;

controlling the plurality of threads in the thread pool so the plurality of threads can process a predetermined number of tasks, that is more than the first number of tasks, added by the latency-sensitive event-based processor, before processing tasks added by other event-based processors; and based on determining the latency-sensitive event-based processor is processing events in the event table with a latency that does not meet the latency metric, selecting the latency-sensitive event-based processor to process events at the first selection frequency.

2. The computer implemented method of claim 1, comprising:

determining which event-based processors, in the set of event-based processors, are latency-sensitive event-based processors;

evaluating latencies of the latency-sensitive event-based processors processing events; and for each latency-sensitive event-based processor:
  selecting the latency-sensitive event-based processor and determining, based on the evaluated latency, whether the selected latency-sensitive event-based processor is processing events that meets a corresponding latency metric, that corresponds to the selected latency-sensitive event-based processor;
  based on determining that the selected latency-sensitive event-based processor does not meet the corresponding latency metric, prioritizing the selected latency-sensitive event-based processor by selecting the selected latency-sensitive event-based processor to process events at the first selection frequency;
  based on determining that the selected latency-sensitive event-based processor meets the corresponding latency metric, returning the selected latency-sensitive event-based processor to a non-prioritized state by selecting the selected latency-sensitive event-based processor to process events at the second selection frequency that is higher than the first selection frequency.

3. The computer implemented method of claim 1, and further comprising:

when the latency-sensitive event-based processor is processing events with a latency that meets the latency metric, then controlling the plurality of threads in the thread pool by relieving constraint on the plurality of threads in the thread pool so the plurality of threads in the thread pool can process more than the first number of tasks added by the latency-sensitive event-based processor, before processing tasks added by other event-based processors.

4. The computer implemented method of claim 3 wherein selecting the latency-sensitive event-based processor to process events at the second selection frequency comprises:
  selecting the latency-sensitive event-based processor to process events at a pre-defined, increased frequency, relative to the first selection frequency.

5. The computer implemented method of claim 3, wherein selecting the latency-sensitive event-based processor to process events at the second selection frequency comprises:
  in response to determining that the latency-sensitive event-based processor is processing events with a latency that exceeds the latency metric, selecting the latency-sensitive event-based processor to process events at a dynamically selected second frequency, selected based on an amount by which the latency-sensitive event-based processor exceeds the latency metric.

6. The computer implemented method of claim 3, wherein controlling threads by relieving the constraint comprises:
  in response to determining that the latency-sensitive event-based processor is processing events with a latency that exceeds the latency metric, controlling the plurality of threads in the thread pool so the plurality of threads can process a dynamically selected number of tasks, that is more than the first number of tasks, added by the latency-sensitive event-based processor, before processing tasks added by other event-based processors, the dynamically selected number of tasks being selected based on an amount by which the latency-sensitive event-based processor exceeds the latency metric.

7. The computer implemented method of claim 1, wherein detecting a set of events comprises generating a set of event entries in an event data store, each event entry representing a detected event in the set of events; and
selecting the latency-sensitive event-based processor comprises:
  selecting, at the first selection frequency, the latency-sensitive event-based processor to pull a subset of events from the event data store and place the subset of events in the event queue corresponding to the latency-sensitive event-based processor; and
  adding tasks, that correspond to the subset of events in the event queue, to the thread pool queue.

8. A computer system, comprising:
one or more processors; and
memory that stores instructions which, when executed by the one or more processors, cause the one or more processors to:
  detect a set of events generated by operations in a computing environment;
  store each event of the set of events in an event table;
  select an event-based processor at a first selection frequency, wherein the first selection frequency defines a frequency at which the event-based processor selects events from the event table;
  place the selected events in an event queue corresponding to the event-based processor and add tasks, that correspond to the selected events from the event queue, to a thread pool queue configured to be processed by a plurality of threads in a thread pool;

determine that the event-based processor is a latency-sensitive event-based processor having functionality that is compromised by a latency that meets a latency value,
  wherein the latency represents a time between when a given event is detected and when a task corresponding to the given event is processed by a thread in the thread pool;
control the plurality of threads in the thread pool to only process up to a first number of tasks, added to the thread pool queue by the latency-sensitive event-based processor, before processing tasks added by another event-based processor;
based on determining that the latency-sensitive event-based processor is processing events in the event table with a latency that meets a latency metric,
  select the latency-sensitive event-based processor to process events in the event table at a second selection frequency that is higher than the first selection frequency, and
  control the plurality of threads in the thread pool so the plurality of threads can process a predetermined number of tasks, that is more than the first number of tasks, added by the latency-sensitive event-based processor, before processing tasks added by other event-based processors; and
based on determining that the latency-sensitive event-based processor is processing events in the event table with a latency that does not meet the latency metric, select the latency-sensitive event-based processor to process events at the first selection frequency.

9. The computer system of claim 8 wherein the instructions cause the one or more processors to:
determine which event-based processors, in a set of event-based processors, are latency-sensitive event-based processors;
evaluate latencies of the latency-sensitive event-based processors processing events; and
for each latency-sensitive event-based processor:
  select the latency-sensitive event-based processor and determine, based on the evaluated latency, whether the selected latency-sensitive event-based processor is processing events that meets a corresponding latency metric, that corresponds to the selected latency-sensitive event-based processor;
  based on determining that the selected latency-sensitive event-based processor does not meet the corresponding latency metric, prioritize the selected latency-sensitive event-based processor by selecting the selected latency-sensitive event-based processor to process events at the first selection frequency;
  based on determining that the selected latency-sensitive event-based processor meets the corresponding latency metric, return the selected latency-sensitive event-based processor to a non-prioritized state by selecting the selected latency-sensitive event-based processor to process events at the second selection frequency that is higher than the first selection frequency.

10. The computer system of claim 8, wherein the instructions cause the one or more processors to:
select the latency-sensitive event-based processor to process events at a pre-defined, increased frequency, relative to the first selection frequency.

11. The computer system of claim 8, wherein the instructions cause the one or more processors to:
based on a determination that the latency-sensitive event-based processor is processing events with a latency that exceeds the latency metric, select the latency-sensitive event-based processor to process events at a dynamically selected second frequency, selected based on an amount by which the latency-sensitive event-based processor exceeds the latency metric.

12. The computer system of claim 8, wherein the instructions cause the one or more processors to:
control the plurality of threads in the thread pool so the plurality of threads can process a predetermined number of events, that is more than the first number of events, provided by the latency-sensitive event-based processor, before processing events provided by other event-based processors.

13. The computer system of claim 8, wherein the instructions cause the one or more processors to:
based on a determination that the latency-sensitive event-based processor is processing events with a latency that exceeds the latency metric, control the plurality of threads in the thread pool so they can process a dynamically selected number of events, that is more than the first number of events, provided by the latency-sensitive event-based processor, before processing events provided by other event-based processors, the dynamically selected number of events being selected based on an amount by which the latency-sensitive event-based processor exceeds the latency metric.

14. The computer system of claim 8, wherein the instructions cause the one or more processors to:
identify a subset of event-based processors, in a set of event-based processors, that are latency sensitive event-based processors; and
monitor each given event-based processor, in the subset, to determine when the given event-based processor is processing events with a corresponding latency that meets a corresponding latency metric that corresponds to the given event-based processor.

15. A computer system comprising:
one or more processors; and
memory that stores instructions which, when executed by the one or more processors, cause the one or more processors to:
determine an event-based processor, in a set of event-based processors, is a latency-sensitive event-based processor having functionality that is compromised by a latency that meets a latency value;
detect a set of events generated by operations in a computing environment;
store each event of the set of events in an event table;
select the latency-sensitive event-based processor at a first selection frequency,
  wherein the first selection frequency defines a frequency at which the latency-sensitive event-based processor selects events from the event table;
place the selected events in an event queue corresponding to the latency-sensitive event-based processor and add tasks, that correspond to the selected events from the event queue, to a thread pool queue configured to be processed by a plurality of threads in a thread pool;
control the plurality of threads in the thread pool to only process up to a first number of tasks, added to the thread pool queue by the latency-sensitive event-based processor, before processing tasks added by another event-based processor;

determine that the latency-sensitive event-based processor is processing events in the event table with a latency that meets a latency metric,
   wherein the latency represents a time between when a given event is detected and a task corresponding the given event is processed by a thread in the plurality of threads;
based on the determination, select the latency-sensitive event-based processor to process events in the event table at a second selection frequency that is higher than the first selection frequency;
control the plurality of threads in the thread pool so the plurality of threads can process a predetermined number of tasks, that is more than the first number of tasks, added by the latency-sensitive event-based processor, before processing tasks added by other event-based processors; and
based on a determination that the latency-sensitive event-based processor is processing events in the event table with a latency that does not meet the latency metric, select the latency-sensitive event-based processor to process events at the first selection frequency.

16. The computing system of claim 15, wherein the instructions cause the one or more processors to:
determine which event-based processors, in the set of event-based processors, are latency-sensitive event-based processors;
evaluate latencies of the latency-sensitive event-based processors processing events; and
for each latency-sensitive event-based processor:
   select the latency-sensitive event-based processor and determining, based on the evaluated latency, whether the selected latency-sensitive event-based processor is processing events that meets a corresponding latency metric, that corresponds to the selected latency-sensitive event-based processor;
   based on a determination that the selected latency-sensitive event-based processor does not meet the corresponding latency metric, prioritize the selected latency-sensitive event-based processor by selecting the selected latency-sensitive event-based processor to process events at the first selection frequency;
   based on a determination that the selected latency-sensitive event-based processor meets the corresponding latency metric, return the selected latency-sensitive event-based processor to a non-prioritized state by selecting the selected latency-sensitive event-based processor to process events at the second selection frequency that is higher than the first selection frequency.

17. The computing system of claim 15, wherein the instructions cause the one or more processors to:
when the latency-sensitive event-based processor is processing events with a latency that meets the latency metric, control the plurality of threads in the thread pool by relieving constraint on the plurality of threads in the thread pool so the plurality of threads in the thread pool can process more than the first number of tasks added by the latency-sensitive event-based processor, before processing tasks added by other event-based processors.

18. The computing system of claim 17, wherein the instructions cause the one or more processors to:
select the latency-sensitive event-based processor to process events at a pre-defined, increased frequency, relative to the first selection frequency.

19. The computing system of claim 17, wherein the instructions cause the one or more processors to:
in response to a determination that the latency-sensitive event-based processor is processing events with a latency that exceeds the latency metric, select the latency-sensitive event-based processor to process events at a dynamically selected second frequency, selected based on an amount by which the latency-sensitive event-based processor exceeds the latency metric.

20. The computing system of claim 17, wherein the instructions cause the one or more processors to:
in response to a determination that the latency-sensitive event-based processor is processing events with a latency that exceeds the latency metric, control the plurality of threads in the thread pool so the plurality of threads can process a dynamically selected number of tasks, that is more than the first number of tasks, added by the latency-sensitive event-based processor, before processing tasks added by other event-based processors, the dynamically selected number of tasks being selected based on an amount by which the latency-sensitive event-based processor exceeds the latency metric.

* * * * *